J. P. COLLINS.
Water Wheel.
No. 979. Reissued June 12, 1860.
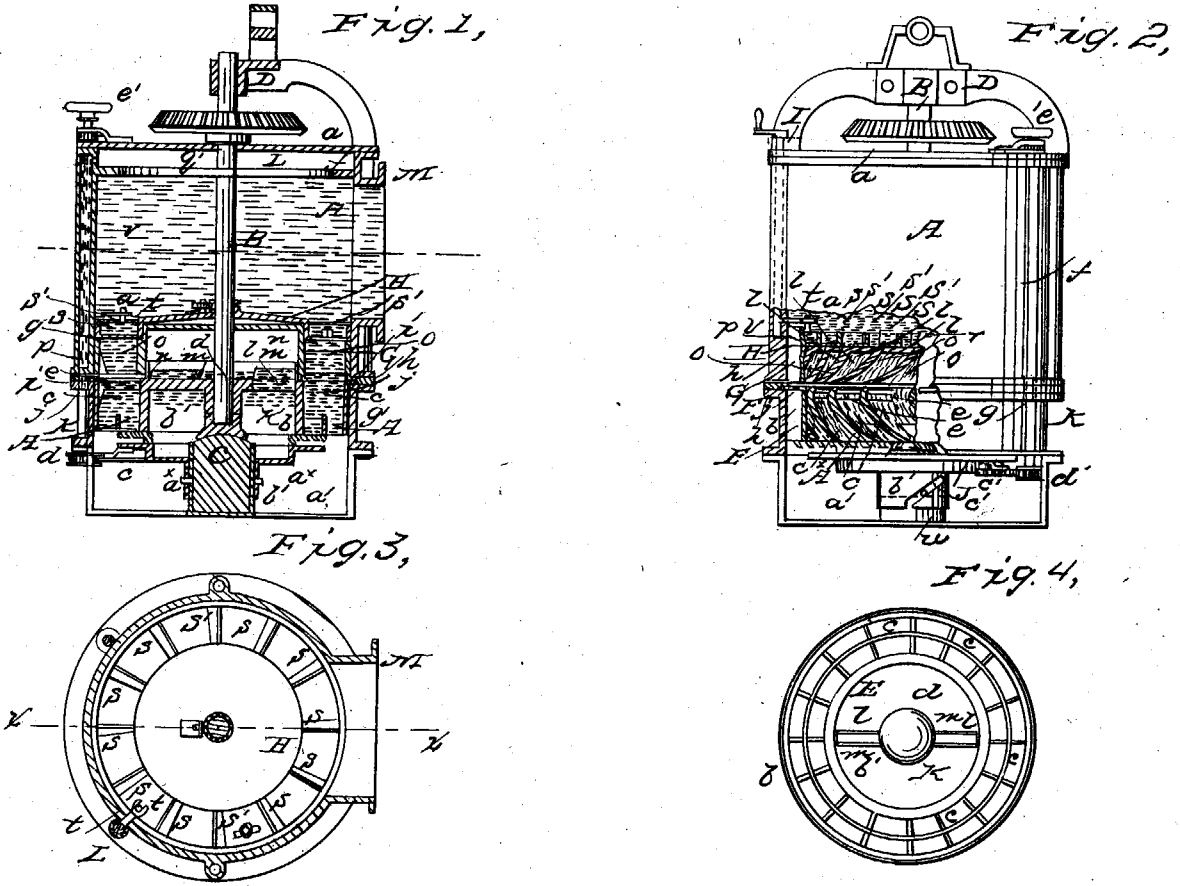
WITNESSES:
Robert Wallace
A. M. Henderson
INVENTOR:
J. P. Collins.
N. PETERS, Photo-Lithographer, Washington, D. C.

UNITED STATES PATENT OFFICE.

JAMES P. COLLINS, OF TROY, NEW YORK.

IMPROVED WATER-WHEEL.

Specification forming part of Letters Patent No. 26,339, dated December 6, 1859; Reissue No. 979, dated June 12, 1860.

*To all whom it may concern:*

Be it known that I, JAMES P. COLLINS, of Troy, in the county of Rensselaer and State of New York, have invented certain new and useful Improvements in Water-Wheels; and I do hereby declare that the following is a full, clear, and exact description of the same, reference being had to the annexed drawings, making a part of this specification, in which—

Figure 1 is a vertical section of a water-wheel constructed according to my invention; Fig. 2, a side view of the same with a portion broken away; Fig. 3, a horizontal section of the same taken in the line *y y*, Fig. 1; Fig. 4, a detached inverted plan of the wheel.

Similar letters of reference indicate corresponding parts in the several figures.

This invention relates to certain improvements in that class of water-wheels which are generally known as turbine wheels.

The invention consists, first, in the peculiar arrangement of a lighter-plate, for relieving the step of the wheel-shaft of the weight of the wheel and the pressure of the water on the buckets of the wheel, thereby greatly reducing friction. Second, in the arrangement of a packing-ring, so that it shall be sustained in its position by the casing, as hereinafter shown and described, for the purpose of compensating for any irregular movement of the wheel or any lateral movement of the step, allowing the wheel to run nearly water-tight, and at the same time causing little friction. Third, in the peculiar arrangement of the projection or flange of the buckets, for the purpose of retaining the water within the wheel or preventing the water from being deflected upward as it strikes the bucket. Fourth, in the particular arrangement of a gage or regulator-plate below the wheel, in combination with the peculiar device hereinafter described which operates it, whereby the discharge of a portion of the water is controlled or regulated without obstructing or in any manner changing the velocity of the remaining portion not thus acted upon by the regulator-plate, and thus causing the pressure and action of the water on the buckets of the wheel to be relatively the same, whether the quantity of water to be used be more or less. Fifth, in the employment or use of a dividing strip or ring inserted in the buckets at the point of discharge of the same diameter as the regulator-plate, when used in connection with it, to prevent the water resting on the top of said plate being thrown out laterally by centrifugal force, thereby obstructing the discharge of water from the portion of the buckets outside of the circumference of said regulator-plate. Sixth, in forming a joint as nearly water tight as may be between the upper flange of the wheel at the inner sides of the buckets and the lower part of a circular box above them, in connection with discharge-openings in the top of the center of the wheel, substantially as hereinafter described, whereby the step of the wheel-shaft is relieved of unnecessary pressure of water.

To enable those skilled in the art to fully understand and construct my invention, I will proceed to describe it.

A represents a cylinder, having a head, *a*, fitted tightly on its upper end, and B represents a vertical shaft, which is fitted centrally within the cylinder A, the lower end of the shaft resting on a step or bearing, C, which is placed at the junction of cross-bars *a′*, attached to the bottom of cylinder A. The upper end of the shaft B has its bearings at the center of a cross bar, D.

E represents the wheel, which is secured to the lower part of the shaft B. This wheel is formed of two rims or annular flanges, *b b′*, between which the buckets *c* are placed. The inner rim or plate, *b′*, is connected by a central plate, *d*, with the hub or boss *e* of the wheel, and the outer rim or plate, *b*, is connected to a rim or plate, *b′*, by its buckets *c*, which are bolted between the two rims *b b′*.

The form or shape of the buckets *c* is plainly shown in Fig. 2. The upper end of each bucket *c* has a lip or projecting flange, *e*, formed on it, as shown plainly in Fig. 2. These lips or flanges project over the faces of the buckets sufficiently far to prevent the water from being deflected upward, and they keep the whole of the water that first strikes the buckets within the wheel and compel it to pass downward and be discharged at the lower ends of the buckets. If the lips or flanges *e* were not employed there would be to a certain extent a reaction against the descending water in consequence of the water that first strikes the buckets being deflected upward, and this resistance would of course detract from the effective power of the wheel.

The cylinder A is formed of two parts, *f g*, provided with flanges *h* at their abutting ends, and secured together by screw-bolts. Between the two flanges *h h* a flat ring or annular plate, F, is interposed. This ring or plate F has a rabbet formed in its under side and at its inner edge, and this rabbet receives a ring, *i*, which encompasses a flange, *j*, in the upper part of the wheel E. (See Fig. 1.)

The flange *j* of the wheel is fitted snugly within the ring *i*, forming a water-tight joint, or as tight as may be but said ring *i* is allowed a certain degree of lateral play or movement in its rabbet, and consequently, if from any cause the wheel should be slightly eccentric in its action, said irregular movement will be compensated for by this movement or play that is allowed the ring. The wheel E, it will be seen, is within the lower part of the cylinder A and the plate *d*, which forms a cover for the central chamber, *k*, of the wheel. The plate *d* has two radial slots or openings, *l l*, made through it, and an oblique plate, *m*, is secured to the edge of each slot or opening, said plates being attached to the upper side of plate *d*.

G represents a circular box, which is permanently secured within the lower end of the upper part, *f*, of the cylinder A, and the lower end of box G is fitted around an annular flange, *n*, at the edge of the plate *d*. It is designed to have the lower end of the box G fit around the flange *n* so as to form a joint as nearly water-tight as may be, and, if necessary, a ring or annular plate similar to *i* may be interposed between the flange and box.

To the outer side of the box G curved plates *o* are attached, and the outer edges of these plates are secured to a rim or annular plate, *p*, which fits snugly within the cylinder A. A horizontal plate, *q*, connects the plate *p* to the box G, and openings *r* are made through said plate.

On the box G and plate *q* a cap, H, is placed. This cap has openings *s* made through it, and by turning the cap H the openings *s* may be made to register with or cover the openings *r* in the plate *q*. The openings *s* have each a slightly inclined plate, *s'*, at one side, as shown clearly in Fig. 2, in order to serve as guides to the water. The cap H is turned by an arm, *t*, the inner end of which is connected with a pin, *u*, on the cap, and the outer end connected with the lower end of a vertical shaft, L, which is fitted in a tube, *v*, attached to the cylinder A. (See Fig. 2.)

The step C, which is a wooden cylinder, is encompassed by a metal tube or cylinder, *w*, which has two pins, $a^+$ $a^+$, projecting horizontally from it at opposite points, as shown clearly in Fig. 1. On this tube or cylinder a circular plate, J, is placed, said plate being provided with a hollow hub, *b'*, which is allowed to slide freely on the tube or cylinder *w*, and has oblique slots, *c'*, made in it in which the pins $a^\times$ $a^+$ fit. (See Fig. 2.) The plate J is of such diameter that its edge extends to the center of the bottoms of the buckets *c* of the wheel E. To one side of the plate J a segment-rack, *c'*, is attached, and into this rack a pinion, *d'*, gears, said pinion being on a shaft, K, which extends upward by the side of the cylinder A, and is surmounted by a hand-wheel, *e'*.

On the upper part of the shaft B a circular plate, L, is placed. This plate is fitted within a flange, *f'*, on the inner side of the cylinder A, and so as to run water-tight, or as nearly so as may be. The space or chamber *q'*, above the plate L, communicates with the upper end of a tube, *v'*. (See Fig. 1.) M is the flange to which the induction-pipe is attached.

When the wheel is in operation, the pressure of the water within the cylinder A against the plate L will relieve the step C of the weight of the wheel E and also of the pressure caused by the action of the water on the wheel, and all water that may leak through between the edge of plate L and the flange *f'* escapes down the tube *v'*. The water is let on the wheel by adjusting the cap H, the plates *o* directing the water properly to the buckets *c* of the wheel E. All water that leaks through between the box G and the flange *n* of the wheel E is forced downward through the openings *l l* by the oblique plates *m m*. The chamber $x^+$, therefore, within the box G is kept free from water, and the plate *d*, and consequently the wheel E, relieved of the weight of the water, which would otherwise fill the chamber $x^+$ and press on plate *d* with a force due to the height of the column or head of water under which the wheel is working.

The discharge or escape of the water from the wheel E is regulated by raising or lowering the plate J, which is done by turning the shaft K, the pinion *d'* on said shaft turning the plate J on account of the pins $a^+$ fitting on the oblique slots *c'* of the hollow hub *b'*.

By means of the plate J the escape of water may be regulated as desired, so that the discharge may be commensurate with the height of the head of water, and the maximum power due to the head always obtained.

The wheel E has a ring or annular plate, $A^+$, inserted in its buckets *c*, said ring being of the same diameter as the plate J. This ring $A^+$ prevents the water on top of plate J being thrown out laterally by centrifugal force, so that the discharge of water from the wheel at the outside of the plate J will not be at all obstructed.

I do not claim as new the idea of relieving the step of all or any portion of its pressure by means of a lighter-plate, irrespective of the position in which it is placed and the manner in which it is operated. Neither do I claim as new the curved portion of the guides or deflecting-plates placed above the wheels, as this portion of them has been used by others. Nor do I claim any particular form or angle given to the lower portion of the buckets *c*.

What I claim as my invention, and desire to secure by Letters Patent, is—

1. The arrangement of the lighter-plate L in the particular manner specified and for the purpose set forth.

2. The arrangement in the particular manner specified of the packing-ring *i*, for the purpose set forth.

3. The arrangement in the particular manner specified of the lip or projecting piece *e* of the buckets, for the purpose set forth.

4. The arrangement in the particular manner specified of the regulating-plate J, in combination with the peculiar specified device for operating it, for the purpose set forth.

5. The employment or use of the dividing strip or ring inserted in the buckets, substantially as and for the purpose set forth.

6. The fitting of the lower part of the box G over the annular flange *n* of the wheel, as shown, or in an equivalent way, so as to form a joint as nearly water-tight as may be, in connection with the openings *l l* in the plate *d*, and the oblique plates *m* at the sides of the openings, as and for the purpose herein set forth.

7. The employment for united use in one wheel of the lighter-plate B, packing *i*, projecting lips or flanges *e*, gage or regulating plate J, and annular dividing-plate A+, the whole being constructed, arranged, and operating in the manner and for the purpose set forth.

JAMES P. COLLINS.

Witnesses:
T. S. BANKER,
I. M. LANDON.